Feb. 24, 1953 P. SCHWERIN 2,629,645
AUDIENCE RESPONSE INDICATING SYSTEM
Filed Oct. 22, 1947 3 Sheets-Sheet 1
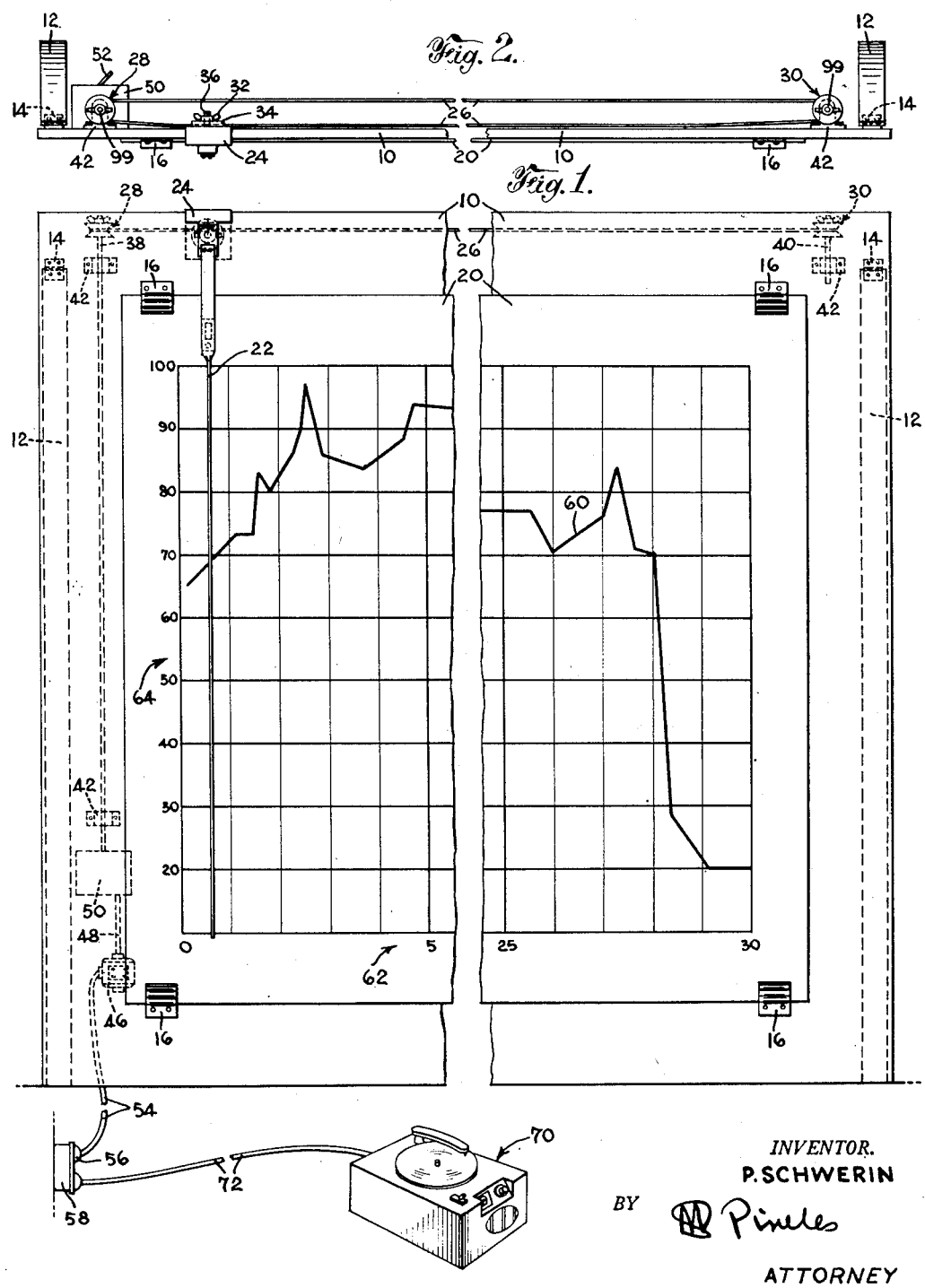
INVENTOR.
P. SCHWERIN
BY AP Pineles
ATTORNEY Feb. 24, 1953  P. SCHWERIN  2,629,645
AUDIENCE RESPONSE INDICATING SYSTEM
Filed Oct. 22, 1947  3 Sheets-Sheet 2
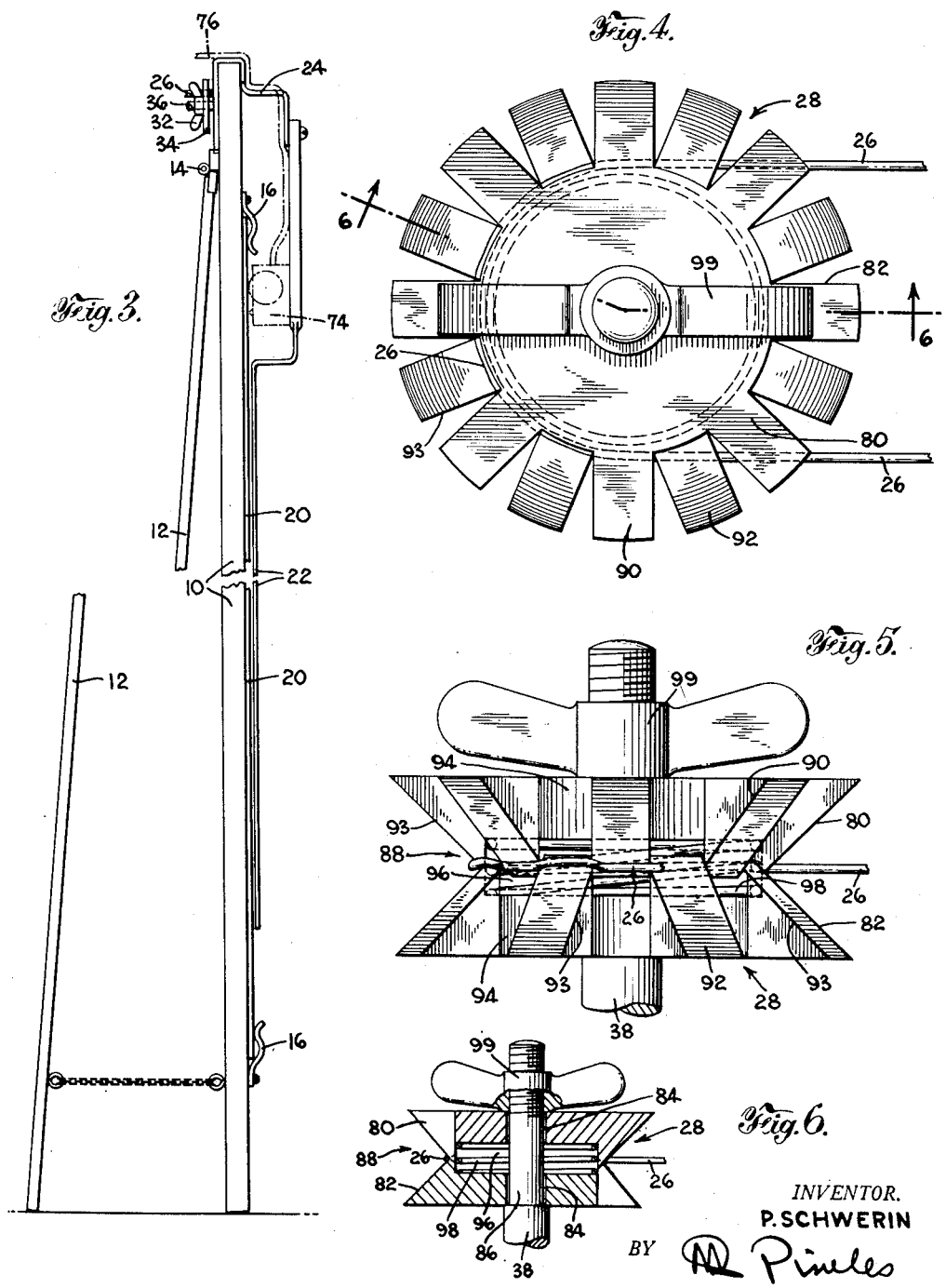
INVENTOR.
P. SCHWERIN
BY [signature]
ATTORNEY Feb. 24, 1953 P. SCHWERIN 2,629,645
AUDIENCE RESPONSE INDICATING SYSTEM
Filed Oct. 22, 1947 3 Sheets-Sheet 3
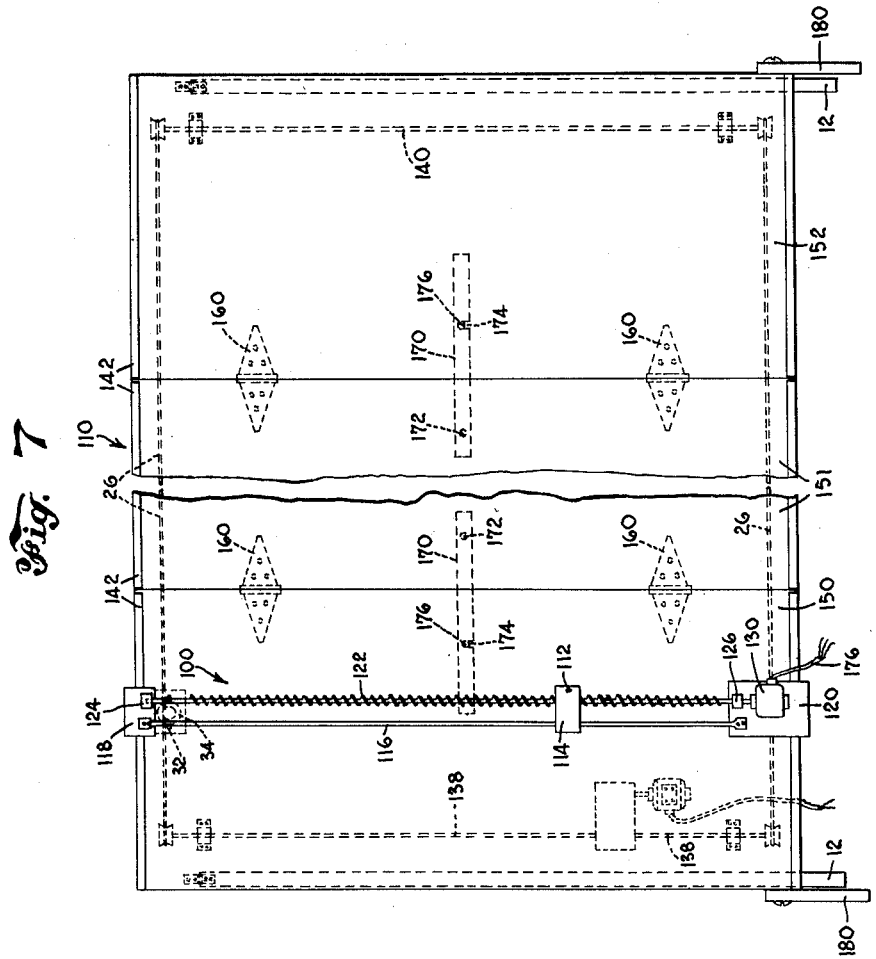
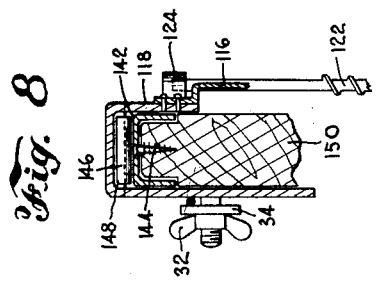
INVENTOR.
P. SCHWERIN
BY 
ATTORNEY Patented Feb. 24, 1953

2,629,645

UNITED STATES PATENT OFFICE 2,629,645

AUDIENCE RESPONSE INDICATING SYSTEM

Paul Schwerin, White Plains, N. Y., assignor to Schwerin Research Corporation, New York, N. Y., a corporation of New York Application October 22, 1947, Serial No. 781,454

9 Claims. (Cl. 346—17)

1

This invention relates to audience response indicating mechanisms and more particularly to that type of mechanism which produces a readily visible indication of the degree of approval with which an entertainment program is received by an audience.

Among the objects of the invention is novel response indicating mechanisms having a pointer synchronized with the presentation of a program and moving over a chart to indicate at all times the reaction to the portion of the program being presented.

Further objects of the invention include novel audience response indicating mechanisms for operation in synchronism with an entertainment program for preparing and maintaining a visible exhibit of audience response to the program.

Still further objects of the invention include audience response indicating mechanisms having novel synchronizing or driving arrangements of simple and inexpensive construction and capable of a high degree of accuracy.

The foregoing and other objects of the invention will be best understood from the following description or exemplifications thereof, reference being had to the accompanying drawings herein:

Fig. 1 is a broken elevational view of one form of audience response indicating mechanism according to the invention;

Fig. 2 is a plan view of the form of the invention shown in Fig. 1;

Fig. 3 is a side view with parts removed of the audience response indicating mechanism of Fig. 1;

Fig. 4 is an enlarged plan view showing in detail a portion of a modified audience response indicating mechanism exemplifying the invention;

Figs. 5 and 6 are respectively a front and sectional view taken along line 6—6 of the portion of the mechanism shown in Fig. 4; and Figs. 7 and 8 are views similar to Figs. 1 and 2 of a different form of audience response indicating mechanism embodying the invention.

The demonstration of audience response to programs such as radio and television broadcasts presented by sponsors who are interested in appealing to selected types of audiences has been subject to several difficulties. The most practical forms of device hitherto used have been of the recording ammeter type for preparing a graph of audience approval on a circular chart of the type generally made by such instruments. Such charts are exceedingly difficult to read because of the angular coordinates used in its preparation and is almost impossible to utilize as a convenient indication of the program either by itself or in combination with a copy of the program script.

The indicator mechanism of the instant invention avoids these difficulties and provides an inexpensive construction on which a linear chart clearly exhibits audience response while a traveling pointer, synchronized with a program presenting device such as a phonograph, moves across the chart and constantly indicates in a clear and easily understood manner the audience response to the portion of the program being presented.

Figs. 1, 2, and 3 show one simple form of the invention in which a display panel 10 which may have legs 12 hinged as indicated at 14 to permit the panel to be erected for convenient display has one face provided with retaining members such as spring clips 16 by which an audience response chart 20 may be securely held in place for ready observation. A pointer 22 is shown as held on a bracket 24 slidably guided along the display panel 10 as for example along the top edge.

The pointer 22 and bracket 24 are, in the form shown, arranged for being impelled across the chart receiving face of the panel 10 by means of an endless belt 26 held between an impelling pulley 28 and idler pulley 30. The belt 26 is shown as secured to the pointer bracket 24 by means of a wing nut 32 threadedly engaged on a stud 36 projecting from the bracket and clamping the belt between a washer 34 and the body of the bracket. The pulleys 28, 30 are rotatably held on shafts 38, 40 respectively and mounted on the back of the display panel 10 as by the mounting blocks 42. Shaft 40 may merely be a stud shaft or pin fixedly secured and rotatably holding its idler pulley 30.

The impelling pulley shaft 38 is a drive shaft extended to be driven by a motor 46 which may be of the synchronous type operating at a constant speed without the necessity of adjustment or calibration. A variable ratio transmission 50 may be inserted between the motor 46 and the impelling pulley 38 to provide a plurality of selectable pointer driving speeds as is more fully explained below. The transmission box 50 may be directly coupled to the drive shaft 38 and a motor shaft 48 to which the impelling power is imparted by the motor 46. The transmission box may also be provided with a shift lever 52 for changing the transmission drive ratio when desired.

The entire mechanism is quite simple and may merely be operated by connecting the impelling motor to a suitable source of energy as for example by electrical supply line 54 having a plug 56 at its end for connection in a convenient electric power supply outlet 58.

The indicator mechanism of the invention may be very readily used in the following manner: chart 20 which contains a clearly visible indication such as the heavily inked line 60 graphically prepared on a scale having time as one axis and audience approval as the other, is mounted in place in the chart receiving portion of the display panel 10. As shown, the time axis 62 is horizontal and the audience approval axis 64 is vertically disposed and scaled in percentage with one hundred percent audience approval at the top. The transmission shift lever 52 is then set to the number of program minutes covered by the chart and the pointer 22 brought to the zero time line. Inasmuch as the belt driving pulley 28 does not readily slip, the setting of the pointer 22 is effected by loosening the pointer attachment to the belt as by means of the wing nut 32 and sliding the pointer bracket to the desired position after which the wing nut 32 is again tightened to securely fasten the belt in place. The apparatus is now ready and the motor 46 is started as soon as the program is initiated.

In the form shown in Fig. 1 the program may conveniently be supplied by conventional program presenting or reproducing devices such as the record player 70 which may also be electrically operated from electrical outlet 58 as by the electrical supply cable 72. The commencement of operation may conveniently be effected by closing a switch (not shown) energizing the driving motor 46 as soon as the opening portion of the program is heard. The pointer 22 immediately starts to move and slowly travels across the chart 20 in synchronism with the program being presented. The party to which the demonstration is being made is readily able to visibly follow the place on the chart at which the pointer 22 crosses the responsive curve 60 while listening to the audible program and can tell at a glance how any portion of the program has been received. The chart 20 may be of fairly large size as, for example, six feet wide and three feet high so that the audience response can be readily displayed simultaneously to a large group of people.

The chart may conveniently be prepared from data supplied by audience-reaction analyzing systems such as the one disclosed in the Schwerin patent application, Serial No. 663,424, filed April 19, 1946, now abandoned, in which each member of the audience is provided with response indicating lever and an electrical control can be used to periodically record the approval indicated by the response levers.

A feature of the invention is the driving connection between the pulley 28 and belt 26. Any slippage at this point would render the apparatus useless inasmuch as the pointer 22 would not be maintained in proper synchronism. Additionally, driving belts have to be replaced occasionally and unless the replacement is of substantially identical dimension and physical characteristics as the original the effective diameter of the driving pulley 28 engaged by the belt 26 would vary and the pointer would be incapable of synchronization.

One form of the invention for avoiding these difficulties is shown in Figs. 4, 5, and 6 which are detailed views of pulley 28 and its engagement with belt 26. As shown, the pulley 28 includes an upper pulley portion 80 and a generally similar separate lower pulley portion 82 adjustably held apart at varied spacings on the drive shaft 38. The pulley portions 80, 82 may be substantially identical each having a central aperture 84 fitted over a reduced end portion 86 of the drive shaft 38. The facing walls of the pulley portions 80, 82 have peripheral regions cooperating to define a generally V shaped pulley groove 88 in which the belt 26 is fitted. The walls of the V groove 88 are not continuous but are formed by toothed projections 90, 92 extending radially from a central hub region 94 of each pulley portion 80, 82. The teeth 90, 92 of the respective pulley portions are displaced with respect to each other so that a tooth in one portion fits in between two adjacent teeth of the other.

The facing portions of the teeth 90, 92 extend inwardly further than the hubs 94 so that the inward ends of the teeth overlap and mesh as shown more clearly in Fig. 5. The inward tooth extensions also provide a central cavity 96 in which may be received a spring 98 urging the pulley portions apart and cooperating with a retaining device such as wing nut 99 threadedly engaged with the end of drive shaft 38 to securely and adjustably hold the pulley portions in a relatively fixed position with respect to each other.

The teeth 90, 92 have angular corners 93 defining the generally V shaped groove 88. The belt 26 held in the groove 88 is subjected to tensile forces which wedge it firmly in the bottom of the groove. As so disposed, the belt 26 is held against the angular projections 93 and between these projections or edges the belt is drawn deeper in the grooves along the sloping face of a tooth 90 or 92. At the facing edges 93 of adjacent teeth 90, 92 the belt 26 is held further out in the groove than where it is permitted to slide down the sloping teeth surfaces. On either side of a pair of adjacent projecting edges 93 the faces of the adjacent teeth slope in different directions so that the belt assumes a sinuous form as shown in Fig. 5. The sinuousities assist in wedging the belt between adjacent edges 93. The entire pulley assembly shown accordingly provides an essentially non-slip belt engagement.

Furthermore the diameter at the vertex of the groove 88 is adjustable so that the proper belt driving ratio may be obtained with belts of varying diameters or thicknesses. Thus when mounting a belt in place, the separation of the pulley halves 90, 92 is adjusted by wing nut 99 until the pointer speed is properly synchronized with the motor 46. This is easily effected and once completed requires no adjustment until the belt is replaced.

The audience response indicating mechanism of the invention in an inexpensive form may use a driving belt 26 of string or twine which involves a minimum of constructional cost. The pulleys may be fairly small without subjecting any parts to excessive wear. Twine belts have a fairly long life and are easily replaced. A piece of twine is merely looped around the pulleys, the ends of the twine knotted together and cut off close to the knot. The knot does not interfere with the pointer impelling especially if made quite small as by using thin twine and pulling on the twine until the knot diameter is about the same as the unknotted twine.

Other forms of the invention may include permanent type belts. For example the pulleys 28, 30 may be sprockets driving an endless chain to which the pointer bracket may be secured as by a clamp engaging the upper and lower faces of the chain.

The important features of the invention include the movement of a pointer over a large and clearly legible chart in synchronism with the program. In its preferred form the pointer is linear and moves linearly so that the chart is more readily understood by the observers. Additionally all the chart receiving space of the display panel may be used for programs of varying duration by merely selecting a corresponding pointer drive speed. Thus the chart may be six feet wide necessitating a pointer speed of 0.2 feet per minute for a thirty minute program. A fifteen minute program chart of the same width may also be used in its place by doubling the spointer speed. Five-minute program charts would require a corresponding change.

According to the invention the indicator mechanism transmission box 50 is provided with pointer speed changing drives to furnish the proper pointer speeds for any desired program length. The transmission lever 52 is shown as arranged to conveniently vary the gear reduction ratio between motor shaft 48 and drive shaft 38 to this purpose. The box may bear suitable legends to indicate the proper gear shift lever position for the program being presented.

The observers to whom the audience approval charts are displayed on the indicator mechanism of the invention, are normally interested in the type of audience whose response is being indicated. Thus one observer or program sponsor may be interested in the response of housewives, another in the response of working girls, professional people, etc. The charts used are prepared from audiences properly selected to give the desired representation. A single chart may have a plurality of different curves 60 to simultaneously indicate the approval by different classes of audiences. The different curves may be prepared in different colors so that they are readily distinguished. Other features of the charts may also bear distinguishing marks. For example, the various portions of the program may be subdivided into the classes of material presented such as pure entertainment, announcements, commercial passages, etc., and they may be represented by differint colors or widths of indicator line 60.

Fig. 7 shows a different form of a response indicating mechanism made according to the invention. In this form, an indicator mechanism indicated generally at 100 is movable laterally across a chart reeciving area of a supporting panel 110, and is arranged to directly apply marks corresponding to the desired curve or graph similar to that shown at 60 in Fig. 1. The indicating mechanism includes a marking device, such as pen 112, carried on a vertically movable block 114 which may also include an ink feed for maintaining the pen 112 in writing condition. The vertical travel of block 114 is guided along a guide rod 116 fixed between two slide runners 118, 120, which in turn are horizontally guided along the supporting panel 110 to traverse the chart receiving area. The guide rod 116 may be square in section, fitted within a corresponding square passageway in block 114. A vertical impelling assembly may also be affixed to the slide runners 118, 120 to raise and lower the indicating block 114 in a manner corresponding to the response of the audience to a program presentation.

In the form shown, the vertical impeller includes a threaded rod 122 rotatably journalled in bearing supports 124, 126 on the respective slide runners and threadedly engaged in a nut member, (not shown), secured to the block 114. The threaded rod 122 is coupled to a rotating means shown as a selsyn type electric motor 130 held on one of the slide runners. Impelling motor 130 is connected by an electric supply cable 176 with a corresponding selsyn type generator which is rotated by an audience approval responding mechanism. As is well known, the combination of a selsyn generator and a selsyn motor utilizes the principle of rotating magnetic fields for interlinking the relative rotation of the motor shaft with that of the generator shaft, and assuring that at all times both shafts are held in correspondingly rotated positions. The selsyn generator for the vertical impelling construction of Fig. 7 may be connected for direct actuation by the audience approval. Thus, for example, each member of the audience may be provided with a signal unit including an arm that can be moved to various signal positions to indicate the degree of approval to the portions of the program as they are presented, as more completely shown in my co-pending application, Serial No. 51,630, filed September 28, 1948, now Patent No. 2,529,519. The signal units may be interconnected with power supply so that an energizing current passing through the signal units in parallel, for instance, will increase as the approval indicated on the signal units increases, and will decrease as the indicated approval decreases. The resulting indicating current made by suitable amplification may be used to rotate the selsyn generator shaft as by providing a similar block and threaded rod connection 114, 122 and moving the block longitudinally of the threaded rod in accordance with the intensity of the indicating current. The generator actuating block may be vertically moved by pivotally connecting it through a linking arm to the armature of the solenoid, the windings of which are supplied to the amplified indicating current. The generator operating block may be biased to the zero approval position so that in the absence of solenoid energizing current the selsyn generator will be in a position where it brings selsyn motor 130 to the corresponding position and the indicating block 114 is also in the zero recording position. As the solenoid energizing current increases, the generator control block will be raised, rotating the selsyn generator shaft and correspondingly rotating the shaft of selsyn motor 130 to bring the marking block 114 to the proper vertical position. The threaded rod connected to the selsyn generator shaft should have a thread pitch of such nature that its actuating block can easily rotate the selsyn generator shaft. Additionally, the number of selsyn generator and selsyn motor shaft revolutions for complete vertical travel of their associated blocks should be limited to ensure that there is no appreciable delay between variations in vertical impelling currents and the positioning of the marking block 114.

The device of the invention described above in connection with Fig. 7 may be readily used for preparing charts showing the reaction of the audience to the progress of a program as presented for instance by a group of actors and singers, or by a program device such as represented by the phonograph 17 in Fig. 1. The marking mechanism 114 may be electrically controlled by the electric cable leads 176 for applying an ink mark to the upper margin of the chart when the supply circuit associated with the leads 176 is energized. For example, a solenoid operated printing die and an ink-contained ribbon similar to a typewriter ribbon may be incorporated in the marking device 114 and arranged so that when the solenoid is energized its armature causes the printing die to strike the ribbon against the chart of the panel 110 leaving thereon the clearly visible mark.

The marking device 114 may also include a mechanism for applying indicia of the level of the audience reaction at the instant the mark is made. The indicia may be in the form of numerals, ranging for instance from 1 to 100 for representing the percentage of the audience approval corresponding to curve 60 in Fig. 1. The indicia numerals may be applied for instance by means of a printing roller carrying on its periphery the indicia numerals and arranged for rotation to bring the proper numeral into the printing position. Any conventional technique for selectively controlling the rotation of the printing roller to a desired printing position such as selsyn motor, may be used for this purpose. A recording arrangement, such as tape or card punching apparatus, may be controlled by an operator and connected to the various response indicating levers which are under the control of the individual members of the audience. At selected portions of the presentation the operator may cause a recording to be made of the positions of all the individual approval indicating levers as described in the above mentioned Schwerin application. The apparatus of the instant invention may have its marking mechanism synchronized with the recording action so that a distinguishing mark is applied whenever a record is made. After the first presentation, recordings of the approval by other audiences of the same portions of the program may be readily made by utilizing the apparatus of the invention with a previously marked chart mounted in place. The synchronized pointer moving across the chart will successively pass over the previously prepared distinguishing marks and the operator merely makes another set of readings when the pointer reaches the marks. The set of marked charts is readily completed by applying to the graph region guide points indicating the level of audience approval corresponding to a point on the time axis opposite the distinguishing mark. This is readily performed by merely referring to the approval records made as, for example, the punched tapes, and placing a guide point a suitable distance directly below each of the identification marks. The necessity of referring to the time axis and accurately aligning the guide points with it is thereby avoided.

In the form of the invention which includes a marking device for applying legible indicia of the level of audience response the marking control may have a printing wheel rotated by a solenoid operated armature, the windings of which carry a current corresponding to the positions of the audience approval levers. The printing wheel with the indicia at its periphery is actuated each time a record of audience approval is made and applies to the chart a legend, such as a number between 0 and 100 simultaneously with the taking of the record. The completely marked chart may then be used for making additional charts with other audiences in the manner explained above and may have the audience approval line, such as line 60 of Fig. 1, applied without further reference to the punched records made. It is only necessary to apply guide points to the graph area directly beneath the printed indicia and spaced from it by a distance corresponding to the legend. The guide points are then interconnected with lines which may be straight, as shown at 60 in Fig. 1, or curved so as to exhibit no sharp breaks.

The slide runners 118, 120 may be both driven horizontally to ensure the maintenance of proper alignment of the vertical travel for the marking block 114. This may be arranged as by providing a wing nut 32 and retaining washer 34 on each of the slide runners 118, 120 and connecting them to a pair of drive belts 26 mounted along each vertical edge of the supporting panel 110, as shown in the dash lines in Fig. 7. The belts may be interconnected by mounting their respective pulley drives on common shafts 138, 140.

As shown in Fig. 7, the supporting panel 110 may be divided into foldable sections so that it can be readily transported in compact form with a relatively small amount of inconvenience. The sections indicated at 150, 151 and 152 may be hinged together as by the hinges shown at 160 on their rear surfaces, and locking means may be applied for securely holding the sections in the unfolded and aligned position in which a chart may be properly held in flat condition on the front display surface. In the form shown in Fig. 7, the locking means may comprise a pair of bars 170 pivoted at 172 and slotted at 174 for rotation into engagement with locking pins 176. The locking pins 176 may be threaded and provided with wing nuts (not shown), by which the bars 170 may be securely held against the locking pins 176 when desired. Additional wing nuts may be similarly used to anchor the bars 170 on their pivot pins 172. The display support 110 may be folded into compact form by loosening the bars 170 on their pins and rotating them out of engagement with the locking pins 176 and confining them to the panel on which they are pivotally held. The panels are thereby freed for folding as desired.

To further facilitate the horizontal movement of the indicating mechanism 100 across the display support 110, the guiding surfaces of the support 110 may be provided with metal guide surfaces along which the slide runners 118, 120 may be easily moved with a minimum of friction. As more clearly shown in Fig. 8, the individual panels of the display structure 110 have secured to their horizontally extending edges metal surfaces 142, shown as channel sections, flush mounted with respect to the front and rear surfaces of the individual panels and held in place as by the countersunk flat-head screws 144. Although the metal edging by itself sufficiently improves the sliding action of the indicator mechanism across the support 110 and is all that is required for constructions shown in Figs. 1 to 3, the movement of the more bulky indicator mechanism of the type shown in Fig. 7 is further facilitated by the insertion of friction reducing elements, such as the rollers 146, between the slide runners 118, 120 and the metal channels 142. Flaps 148 extending at least partially over the sides of the slide runners 118, 124 retain the rollers in place. The horizontal travel of the indicator mechanism frictionally guided, as shown in Figs. 7 and 8, is highly efficient and is devoid of any tendency of varying frictional engagements to tilt and jam it against the guides.

The individual panels 150, 151, 152 may have separate guide channels 142 arranged so that when the panels are unfolded into the display position shown in Fig. 7, the individual channels 142 form a substantially continuous guide surface along each of the horizontal guides. The hinges 160 interconnecting the panels may be arranged so that the hinge axes are displaced outwardly from the hinge faces of the panels to an extent sufficient to appreciably space the individual panels when they are folded. This spacing may be large enough to permit removal or mounting of the indicator mechanism slide runners 118, 120 when desired. The display structure 110 is equipped with legs 180 for raising its lower guiding surface away from any base on which it may be mounted. Alternatively, either or both of the indicator mechanism guide surfaces may be displaced somewhat from the horizontal edges as by providing slots in which the slide runners 118, 120 may be held and guided. Additional foldable legs 12, similar to those shown in the construction of Figs. 1, 2 and 3, are also arranged for suitably holding the display support 110 in erected display condition.

A feature of the invention is the ease with which relatively large and easily seen indicating charts, such as that shown at 64 in Fig. 1, may be prepared and exhibited. In actual use it is not infrequent that such charts are displayed to relatively large groups of critical observers for the purpose of demonstrating to them the approval characteristics of a program in which they are interested. The small size charts which may be prepared with prior art apparatus is not convenient for such purposes since only 2 or 3 observers can study such a small chart at any one time, and they must come fairly close to the chart, within relatively a few feet, in order to observe the graph 60 and notice all its characteristics. On the other hand, the display chart formed and presented according to the invention may be directly made of even such size that it can be readily observed simultaneously by groups of critical observers, as many as 100 at a time. Traversing indicator mechanism, of any of the forms shown above, is a relatively simple structure easily moved even at the relatively high traversing speeds required to span large chart widths in programs of limited duration. The power requirements are quite small whenever used for display purposes, as shown in the example of Figs. 1, 2 and 3.

The apparatus of Figs. 7 and 8 may also be arranged to conveniently display a previously prepared chart, according to a further phase of the invention, by replacing the indicator mechanism 109 with a simplified indicator mechanism, such as that shown at 22 in Fig. 1. Such substitution is readily made so that the same supporting display structure 110 may be used both for preparing and exhibiting charts.

According to an additional form of the invention, the indicator marking mechanism, such as that shown at 109 in Fig. 7, may be modified by placing the guide rod 116 and the threaded rod 122 in alignment in a plane perpendicular to the face of the display surface. These rods 116, 122 so aligned may also be made thin enough so that they constitute an indicating pointer similar to that shown in the construction of Figs. 1 to 3. With this form of the invention, the same audience reaction indicating mechanism may be used both for recording and for displaying a chart. The traveling marking block 114 may for display purposes merely be moved to an extreme vertical position where it does not obstruct the view of the chart area, and the impelling motor 130 may be disconnected as by unplugging the actuating cable 176.

The threaded rod 122 may have its journalled ends fitted to make thrust bearings for resisting deforming forces between the two slide runners directed longitudinally of the rod and further rigidifying the marking assembly. The invention is not limited to a threaded vertical impelling construction for the marking mechanism, but may use other convenient forms of vertical impelling devices, such as, for example, a belt and pulley arrangement similar to that shown for the horizontal travel actuation. Each slide runner 118, 120 may have a belt pulley rotatably mounted thereon and suitably driven for vertical movement in response to the audience approval, as shown above.

It will be apparent to those skilled in the art that the novel principles disclosed herein in connection with specific exemplifications thereof will suggest various other applications and modifications of the same. It is accordingly desired that in construing the breadth of the appended claims they shall not be limited to the specific exemplifications of the invention described herein.

I claim:

1. In an audience response indicating system, program apparatus for representing timed progress of a program to be observed by an audience, and in combination therewith of a chart apparatus comprising a frame structure having a chart mounting region for holding a chart of the response of the audience to selected portions of the timed progress of the program synchronized with the progress of the program of said program apparatus, said chart apparatus including an indicator mechanism comprising an elongated arm movably held on the frame structure for traversing said chart mounting region, synchronous impelling means arranged to operate in synchronized relation with said program apparatus and for moving the indicator structure across the chart mounting region at a speed correlated to the progress of the program for visually indicating the portion of the chart representing the audience reaction to the portion of the program being repeated said impelling means including a drive member and an adjustable transmission structure drivingly connecting said drive member to said indicator structure, said transmission structure having a movable element adjustably settable to adjust the speed at which the motion of the drive member is transmitted to said indicator structure for adjustably bringing the motion of said indicator structure along a chart of predetermined timing length into synchronism with the timed progress of programs of different duration represented by said program apparatus.

2. In an audience response indicating mechanism including a frame structure having a chart mounting region for holding a chart of the audience response to selected portions of the timed progress of a program, for operation in synchronism with a program presenting device to maintain a visual exhibit of audience response to the program: indicator structure including an elongated pointer arm movably held on the frame structure for linearly traversing the chart mounting region synchronous impelling means for moving the indicator structure across the chart mounting region at a speed correlated to the progress of the program for visually indicating the portion of the chart representing the audience reaction to the portion of the program being repeated; pulley means in positive driven engagement with the impelling means; a belt connected to the indicator structure and looped around the pulley means for transmitting impelling forces from the pulley means to the indicator structure; said pulley means including two gear elements each containing gear teeth extending radially from a central axis and having surface portions forming an interrupted generally frusto-conical surface with respect to said axis, and adjustable securing means holding the gear elements selectably spaced and disposed symmetrically with their axes aligned, said generally frusto-conical surfaces facing each other and with their teeth staggered, the teeth of one gear element extending between the teeth of the other so that the facing generally frusto-conical surfaces cooperate to form the interrupted walls of a pulley groove.

3. In an audience response recording mechanism including a frame structure having a chart mounting region for holding a chart of the audience response to selected portions of the timed progress of a program, for operation in synchronism with a program presenting device to maintain a visual exhibit of audience response to the program: indicator structure including an elongated pointer arm movably held on the frame structure for linearly traversing the chart mounting region; synchronous impelling means for moving the indicator structure across the chart mounting region at a speed correlated to the program time for visually indicating the portion of the chart representing the audience reaction to the portion of the program being repeated; pulley means in positive driven engagement with the impelling means; a belt connected to the indicator structure and looped around the pulley means for transmitting impelling forces from the pulley means to the indicator structure; the pulley means including a belt engaging pulley groove bounded by adjustably positioned walls having angular projections in the groove for providing substantially non-slip engagement with the belt and an adjustable effective diameter.

4. In an audience response indicating system as claimed in claim 2, said indicator structure including a marking structure carried by said indicator structure and operative when actuated to apply a mark to said chart.

5. In an audience response indicating system as claimed in claim 2, response means for deriving an indicating action corresponding to the response of the audience, and a marking structure carried by said indicator structure and operative by said response means to apply to said chart a mark corresponding to the indicating action of said response means.

6. In an audience response indicating system as claimed in claim 5, said marking structure comprising a plurality of marking elements arranged to apply digit marks indicating the response of the audience.

7. In an audience response indicating system as claimed in claim 3, said indicator structure including a marking structure carried by said indicator structure and operative when actuated to apply a mark to said chart.

8. In an audience response indicating system as claimed in claim 3, response means for deriving an indicating action corresponding to the response of the audience, and a marking structure carried by said indicator structure and operative by said response means to apply to said chart a mark corresponding to the indicating action of said response means.

9. In an audience response indicating system as claimed in claim 8, said marking structure comprising a plurality of marking elements arranged to apply digit marks indicating the response of the audience.

PAUL SCHWERIN.

REFERENCES CITED

The following references are of record in the file of this patent:

UNITED STATES PATENTS

| Number | Name | Date |
| --- | --- | --- |
| 1,286,234 | Cole | Dec. 3, 1918 |
| 1,678,674 | Koenig, Jr. | July 31, 1928 |
| 2,027,006 | Thomas | Jan. 7, 1936 |
| 2,078,834 | Brennan | Apr. 27, 1937 |
| 2,151,579 | Bacon | Mar. 21, 1939 |
| 2,223,917 | McGloin | Dec. 3, 1940 |
| 2,395,351 | Sohn | Feb. 19, 1946 |